United States Patent [19]

Schenkel

[11] Patent Number: 5,084,532
[45] Date of Patent: Jan. 28, 1992

[54] HOT-MELT ADHESIVE OF EPOXY RESINS AND AMINO GROUPS-CONTAINING POLYOXYPROPYLENE

[75] Inventor: Hubert Schenkel, Sandhausen, Fed. Rep. of Germany

[73] Assignee: Teroson GmbH, Heidelberg, Fed. Rep. of Germany

[21] Appl. No.: 390,140

[22] Filed: Aug. 7, 1989

[30] Foreign Application Priority Data

Aug. 10, 1988 [DE] Fed. Rep. of Germany ....... 3827626

[51] Int. Cl.$^5$ .............................................. C08L 63/02
[52] U.S. Cl. ...................................... 525/524; 523/428
[58] Field of Search ........................................... 525/524

[56] References Cited

U.S. PATENT DOCUMENTS

| | | | |
|---|---|---|---|
| 4,403,078 | 9/1983 | McCoy et al. | 525/504 |
| 4,423,170 | 12/1983 | Waddill | 523/414 |
| 4,514,530 | 6/1985 | Sellstrom | 525/454 |
| 4,552,933 | 11/1985 | Sellstrom et al. | 525/454 |
| 4,578,412 | 8/1986 | Sellstrom | 525/454 |
| 4,661,541 | 2/1987 | Batzill | 523/414 |
| 4,707,232 | 3/1987 | Batzill | 204/181.7 |
| 4,728,384 | 3/1988 | Goel | 525/524 |
| 4,734,468 | 3/1988 | Marx | 525/524 |
| 4,912,179 | 3/1990 | Murakami et al. | 525/504 |

FOREIGN PATENT DOCUMENTS

| | | | |
|---|---|---|---|
| 61-188478 | 8/1986 | Japan | 525/524 |
| 63-308026 | 12/1988 | Japan | 525/524 |
| 2113690 | 4/1983 | United Kingdom | |

OTHER PUBLICATIONS

Abstract of Japanese Patent No. 61-207425 published Sep. 13, 1986.

*Primary Examiner*—Melvyn I. Marquis
*Assistant Examiner*—Robert E. L. Sellers, II
*Attorney, Agent, or Firm*—Valerie E. Looper

[57] ABSTRACT

A reactive hot-melt adhesive is described, which contains a resin component, at least one thermally activatable latent curing agent for the resin component and optionally accelerators, fillers, thixotropic agents and further conventional additives. The adhesive is characterized in that the resin component is obtainable by reacting a) an epoxy resin solid at room temperature and b) an epoxy resin liquid at room temperature with c) a linear polyoxypropylene having amino terminal groups, in which the epoxy resins a) and b) are used in such a quantity, based on the polyoxypropylene with amino terminal groups, that an excess of epoxy groups, based on the amino groups, is ensured.

15 Claims, No Drawings

HOT-MELT ADHESIVE OF EPOXY RESINS AND AMINO GROUPS-CONTAINING POLYOXYPROPYLENE

The invention relates to a reactive hot-melt adhesive, which contains a resin component, at least one thermally activatable, latent curing agent for the resin component and optionally accelerators, fillers, thixotropic aids and other conventional additives. The invention also relates to a process for producing reactive hot-melt adhesives and the use thereof. Finally, the invention relates to a resin, which is suitable as a starting material or intermediate for the production of a hot-melt adhesive, as well as the production and use thereof.

Hot-melt adhesives of the aforementioned type are known. For example, epoxy-based reactive hot-melt adhesives are used in the car industry. These known epoxy adhesives are only slightly flexible in the cured state. The bonds obtained therewith admittedly have a high tension shear strength, but easily crack off on peeling. It is a known problem that in many cases adhesives, with which high tension shear strengths can be obtained, only lead to limited angle peeling strengths.

The procedure frequently adopted in the car industry when bonding metal sheets is that the adhesive is initially applied warm and in not yet completely cured state. On cooling the adhesive solidifies and forms a temporary connection. The thus interconnected metal sheets are treated in washing and phosphating baths. Only then is the adhesive cured in an oven. Thus, there is a need for hot-melt adhesives, which have an adequate washing out or leaching resistance prior to curing.

It is known from DE-A-32 02 300 to add polyols to epoxy resins for increasing flexibility.

DE-A-34 09 181 describes epoxy resins modified with alcohols.

EP-A-0 130 741 discloses polyoxypropylene amines and their use as curing agents for epoxy resins.

The problem of the present invention is to so improve the reactive hot-melt adhesives of the aforementioned type, that a certain degree of flexibility and an increased peeling strength are obtained. This improvement must be obtained without impairing the tension shear strength. The reactive hot-melt adhesives must have an adequate resistance to washing out prior to curing.

The problem of the invention also includes providing a resin, which is suitable as a starting material or intermediate for the production of such reactive hot-melt adhesives.

According to the invention the problem is solved by a reactive hot-melt adhesive of the aforementioned type, which is characterized in that the resin component is obtainable by reacting a) an epoxy resin solid at room temperature and b) an epoxy resin liquid at room temperature with c) a linear polyoxypropylene with amino terminal groups, in which the epoxy resins a) and b) are used in such a quantity, based on the polyoxypropylene with amino terminal groups, that an excess of epoxy resins, based on the amino groups, is ensured.

It is pointed out at the point that components a), b) and c) can also be mixtures of materials of the particular type.

The inventive adhesive leads to a good angle peeling strength with a high tension shear strength.

In the cured state, it in particular has the degree of flexibility required during car manufacture. The resin flexibility can be adjusted in that linear polyoxypropylene with amino terminal groups of different chain length are used and in that the quantity ratio of epoxy resin to linear polyoxypropylene with amino terminal groups is modified. The greater the chain length of the linear polyoxypropylene with amino terminal groups, the greater the flexibility of the resin obtained. The flexibility is also increased by raising the proportion of linear polyoxypropylene with amino terminal groups during the production of the resin component.

The hardness of the reactive hot-melt adhesive in the cooled state, i.e. particularly after application, but prior to curing, is a function of the ratio of the solid epoxy resin a) to the liquid epoxy resin b). The higher the proportion of solid epoxy resin a), the harder the cooled hot-melt adhesive.

It is inventively important that during the reaction of the epoxy resins with the linear polyoxypropylene with amino terminal groups, there is a high excess of epoxy groups, based on the amino groups, so that the latter completely react with the epoxy groups. Typically there is a 5 to 10 times excess, e.g. a 7.5 times excess.

According to the invention, in principle, all commercially available epoxy resins can be used. Preference is given to the use of epoxy resins obtainable from bisphenol A and/or bisphenol F and epichlorohydrin.

Epoxy resin a) must have an adequately high molecular weight, so that it is solid at room temperature. Preferably said resin has an epoxy equivalent weight of 400 to 550 and in particularly preferred manner 450 to 500.

Epoxy resin b) must have an adequately low molecular weight, so that it is liquid at room temperature. Preferably said resin has an epoxy equivalent weight of 150 to 220 and in particularly preferred manner 182 to 192.

The linear polyoxypropylene with amino terminal groups is a compound essentially corresponding to the following formula $$H_2NCH(CH_3)CH_2[OCH_2CH(CH_3)]_xNH_2.$$

In this formula x is preferably on average 28 to 38 and in particularly preferred manner 31 to 35. A particularly preferred linear polyoxypropylene with amino terminal groups has a molecular weight of approximately 2000.

As has already been stated, the characteristics of the reactive hot-melt adhesive can be modified in that the ratio of components a), b) and c) is modified during production. Conventionally approximately 20 to 70% by weight of the epoxy resin solid at room temperature and approximately 15 to 40% by weight of the epoxy resin liquid at room temperature are reacted with approximately 10 to 40% by weight of the linear polyoxypropylene with amino terminal groups. However, it must be ensured that in all cases the inventively essential excess of epoxy groups, based on the amino groups, is ensured.

The thermally activatable latent curing agents can be constituted by all compounds and mixtures of compounds, which are used for this purpose in epoxy resins. However, when choosing the curing agent it must be borne in mind that activation must only take place at a temperature which is well above the softening point of the reactive hot-melt adhesive, e.g. at least 50° C. or at least 100° C. above the softening point. This is necessary on the one hand with respect to the production of the reactive hot-melt adhesive and on the other with respect to its use. An inventively preferred latent curing agent is dicyandiamide.

In the inventive process for the production of the reactive hot-melt adhesive, the resin component is initially produced in a first stage. For this purpose the solid epoxy resin a) and the liquid epoxy resin b) with the linear polyoxypropylene with the amino terminal groups c) are reacted in the desired quantity ratio. Reaction takes place at elevated temperature, preferably at 90° to 130° C., e.g. at approximately 120° C. for 3 hours.

The thus obtained resin is a novel material. The resin is solid at room temperature. It can be immediately further processed to the reactive hot-melt adhesive. However, it is also possible to produce the resin and store it until the time of further processing.

For further processing it is initially necessary to warm the resin in order to reduce its viscosity to such an extent that it can be mixed with the further constituents of the reactive hot-melt adhesive. Preferably the resin is heated to a temperature above 50° C., e.g. 60° C. to 110° C. and in particular 70° C. to 95° C. It must be ensured that heating does not take place to a temperature at which the latent curing agent to be added would be activated. For heating the resin and for mixing with the remaining constituents of the reactive hot-melt adhesive, appropriately a heatable kneader is used. Preferably the latent curing agent is worked into the mixture after the remaining constituents. It is preferred that, prior to the addition of the latent curing agent, the mixture is cooled to a temperature at the lower limit of the range suitable for processing.

The inventive reactive hot-melt adhesive is suitable for bonding parts made from different materials. It is preferably used for bonding metal parts and in particular steel parts.

Normally the adhesive is applied as a melt to one side, i.e. to one of the two parts to be bonded together. It must be ensured that the adhesive is only heated to a temperature at which the latent curing agent is still not activated. The two parts are joined together immediately following the application of the adhesive melt. On cooling the adhesive solidifies and provisionally joins the two parts together.

The thus obtained joint has a certain stability. For example, the not yet cured adhesive is not washed out if the provisionally joined metal sheets are treated in washing tanks for degreasing purposes and subsequently in phosphating baths.

The curing of the adhesive finally takes place in an oven at a temperature, which is well above that at which the adhesive melt was applied to the parts to be joined. Preferably curing takes place at a temperature above 150° C., e.g. at approximately 180° C. for approximately 30 minutes.

Hereinafter the invention is explained in greater detail relative to examples, in which the following abbreviations are used:
EEW: epoxy equivalent weight
TSS: tension shear strength
APS: angle peeling strength Unless otherwise stated, all the quantities are in per cent by weight.

A product produced from bisphenol A and epichlorohydrin was used as the solid epoxy resin a) in the examples. It had an average molecular weight of approximately 900. The epoxy group content was 2000 to 2220 mmol/kg corresponding to an epoxy equivalent weight of 450 to 500. The softening point (Kofler) of said solid epoxy resin was 50° to 70° C. The resin had a density of 1.19 g/ml at 25° C.

In the examples the liquid epoxy resin was constituted by two different products b1) and b2).

Liquid epoxy resin b1) had an epoxy equivalent weight of 177 to 188. The viscosity at 25° C. was 7000 to 10000 mPa.s. The resin had a density of 1.16 g/ml at 25° C.

Liquid epoxy resin b2) had an epoxy equivalent weight of 182 to 192. Its viscosity at 25° C. was 11000 to 14000 mPa.s. Here again, the density was 1.16 g/ml.

The linear polyoxypropylene glycol with amino terminal group c) used in the examples was a product having an average molecular weight of approximately 2000. The viscosity at 25° C. was 280 mPa.s. The activated hydrogen equivalent of the amine was approximately 500.

The viscosity values given in the examples were determined with a rheomat. In each case three measurements were carried out at operating stages 10, 12 and 15.

The tension shear strengths given in the examples were determined by the tension shear test according to DIN 53283. The determination took place at test temperatures of +20° C., +80° C. and −35° C. A further determination was carried out at +20° C., after the particular sample had been stored for 10 days at 40° C. under 100% relative atmospheric humidity. Finally, a determination took place at 20° C., after the sample had undergone the salt spray test according to DIN 50021 for 20 days.

The angle peeling strength given in the examples was determined in the angle peeling test according to DIN 53282. The peeling strength determined from the plateau region of the peeling diagram is given. The precrack peeling strength was determined in a single case for orientation purposes and a value of 115.8±14.3 N/mm was obtained.

EXAMPLE 1

Production of a resin by reacting solid epoxy resin a) and liquid epoxy resin b1) with polyoxypropylene having amino terminal group c).

28.8 parts by weight of liquid epoxy resin b1) were placed in a temperature controlled glass or steel reactor and heated to approximately 100° C. 39.5 parts by weight of solid epoxy resin a) were added all at once in flake form and melted accompanied by stirring. To this melt was rapidly added the polyoxypropylene with amino terminal groups. The reaction was slightly exothermic, so that the mixture heated to approximately 120° C. The mixture was kept for approximately 3 hours at this temperature. After this time it was either supplied warm for further processing or drained off for storage in a storage vessel.

The thus obtained resin had an epoxy equivalent weight of 570. The viscosity at 80° C. was determined with the rheomat at stages 10, 12 and 15 as 47, 48 and 50 Pa.s. A 7.5 times excess of epoxy groups, based on the amino groups was used in the production of this resin.

EXAMPLES 2 to 6

Production of further resins by reacting solid and liquid epoxy resin with polyoxypropylene having amino terminal groups.

Example 1 was repeated several times with the difference that liquid epoxy resin b1) was replaced by liquid epoxy resin b2) and the quantity ratio between components a), b2) and c) was varied.

The quantities of the starting materials used and the measurement results determined on the resins obtained are summarized in table I.

TABLE I

|  |  | Example No. | | | | | |
| --- | --- | --- | --- | --- | --- | --- | --- |
|  |  | 1 | 2 | 3 | 4 | 5 | 6 |
| Solid epoxy resin (a) | (wt. %) | 39.5 | 43.6 | 51.1 | 44.7 | 55.1 | 62.3 |
| Liquid epoxy resin (b1) | (wt. %) | 28.8 | | | | | |
| Liquid epoxy resin (b2) | (wt. %) | | 25.7 | 20.1 | 17.6 | 21.7 | 24.5 |
| Polyoxypropylene with amino terminal group (c) | (wt. %) | 31.7 | 30.7 | 28.8 | 37.7 | 23.2 | 13.1 |
| EEW | | 570 | 600 | 640 | 890 | 540 | 420 |
| Viscosity 80° C. (Pa.s) | | | | | | | |
| Rheomat stage 10/12/15 | | 47/48/50 | 31/29/27 | 23/22/22 | 238/230/227 | 60/56/48 | 72/67/61 |
| Epoxy: amino groups | | 7.5:1 | 7.5:1 | 7.5:1 | 5:1 | 10:1 | 10:1 |

EXAMPLES 7 to 11

Production of hot-melt adhesives

In each case 60 parts by weight of the resins produced in examples 1, 2 or 3 were heated in a heatable kneader to a temperature between 70° and 95° C. The particular temperature chosen from within this range was a function of the viscosity of the resin. Magnesium-aluminium-silicate was then added as the filler and pyrogenic silica or carbon black as the thixotropic aid. The in each case used quantities of these additives are given in table II. The mixture was then cooled to approximately 70° C. and as the latent curing agent 2.5 parts by weight of dicyandiamide and as accelerator paste 0.5 parts by weight of a urea derivative were added. The mixture was homogeneously and smoothly mixed in the kneader. The product was then filled warm.

Apart from the composition of the hot-melt adhesives produced in examples 7 to 11, table II gives their viscosity at 80° C., the tension shear strength determined under different conditions and the peeling strength.

2. Reactive hot-melt adhesive according to claim 1, characterized in that a 5 to 10 times excess of epoxy groups, based on the amino groups, is ensured.

3. Reactive hot-melt adhesive according to claims 1 or 2, characterized in that components a) and b) are epoxy resins obtainable from bisphenol A and/or bisphenol F and epichlorohydrin.

4. Reactive hot-melt adhesive according to one of the preceding claims, characterized in that the solid epoxy resin a) has an epoxy equivalent weight of 400 to 550.

5. Reactive hot-melt adhesive according to claim 4, characterized in that the solid epoxy resin a) has an epoxy equivalent weight of 450 to 500.

6. Reactive hot-melt adhesive according to one of the preceding claims, characterized in that the liquid epoxy resin b) has an epoxy equivalent weight of 150 to 220.

7. Reactive hot-melt adhesive according to claim 6, characterized in that the liquid epoxy resin b) has an epoxy equivalent weight of 182 to 192.

8. Reactive hot-melt adhesive according to any one of the preceding claims, characterized in that component c) corresponds to the formula $$H_2NCH(CH_3)CH_2[OCH_2CH(CH_3)]_xNH_2$$

TABLE II

|  |  | Example No. | | | | |
| --- | --- | --- | --- | --- | --- | --- |
|  |  | 7 | 8 | 9 | 10 | 11 |
| Example 1 | epoxy resins | | | | | 60.0 |
| Example 2 | | | | 60.0 | 60.0 | |
| Example 3 | | 60.0 | 60.0 | | | |
| Mg/Al - silicate | filler | 32.0 | 34.0 | 30.0 | 32.0 | 32.0 |
| Pyrogenic silica | rheology aid | 5.0 | | | | |
| Carbon black | rheology aid | | 3.0 | 7.0 | 5.0 | 5.0 |
| Urea derivative | accelerator | 0.5 | 0.5 | 0.5 | 0.5 | 0.5 |
| Dicyandiamide | latent curing agent | 2.5 | 2.5 | 2.5 | 2.5 | 2.5 |
| Viscosity 80° C. (Pa.s) | | | | | | |
| Rheomat stage 10/12/15 (Pa.s) | | 269/257/232 | 518/414/321 | 4450/2744 | 1593/952/455 | 1345/834/359 |
| TSS: (MPa) DIN 53283 +20° C. | | 35.4 | 30.3 | 24.3 | 28.0 | 27.8 |
| TSS: +80° C. | | 16.9 | 17.1 | 12.6 | 14.4 | 15.7 |
| TSS: −35° C. | | 39.7 | 36.7 | 26.3 | 33.0 | 35.3 |
| 10 days, 40° C./100% r.h. | | 28.3 | 27.2 | 18.3 | 24.1 | 22.5 |
| 20 days salt spray test DIN 50021 | | 24.2 | 21.5 | 14.3 | | |
| APS (N/mm) DIN 53282 peeling strength | | 9.9 | 9.5 | 9.8 | | 6.5 |

I claim:

1. Reactive hot-melt adhesive, comprising a resin component obtained by reacting a mixture of a) an epoxy resin which is solid at room temperature and b) an epoxy resin which is liquid at room temperature with c) a linear polyoxypropylene having amino terminal groups, and at least one thermally activatable latent curing agent for the resin component; the epoxy resins a) and b) being used in such quantity that an excess of epoxy groups is ensured based on the amino groups of the polyoxypropylene.

in which x is on average 28 to 38.

9. Reactive hot-melt adhesive according to any one of the preceding claims, characterized in that it is obtainable by reacting a) 20 to 70% by weight of the epoxy resin solid at room temperature and b) 15 to 40% of the epoxy resin liquid at room temperature with c) 10 to 40 % by weight of the linear polyoxypropylene having amino terminal groups.

10. Reactive hot-melt adhesive according to any one of the preceding claims, characterized in that the latent curing agent is dicyandiamide.

11. Process for the production of the reactive hot-melt adhesive according to claim 1, the steps comprising: reacting
   a) an epoxy resin solid at room temperature and
   b) an epoxy resin liquid at room temperature with
   c) a linear polyoxypropylene having amino terminal groups,
   to a resin component, in which the epoxy resins a) and b) are used in such a quantity that an excess of epoxy groups is ensured based on the amino groups of the polyoxypropylene, and
   mixing the resin component as a melt with the latent curing agent at an elevated temperature, which is below the temperature at which the latent curing agent is activated.

12. Process according to claim 11, characterized in that the reaction step is performed at a temperature in the range 90° to 130° C.

13. Process according to claims 11 or 12, characterized in that the mixing step is carried out at temperatures in the range 60° to 110° C.

14. Process according to any one of the claims 11 to 13, characterized in that the latent curing agent is admixed as the final constituent.

15. Reactive hot melt adhesive according to claim 1, which further comprises one or more of the following: accelerators, fillers, thixotropic aids and conventional additives other than said accelerators, fillers and thixotropic aids.

* * * * *